March 29, 1955

J. A. ROEHRIG 2,705,140

VEHICLE LEAF SPRING SUSPENSION

Filed Dec. 9, 1952

INVENTOR.
JOHN A. ROEHRIG
BY
William J. Ruano
ATTORNEY

United States Patent Office 2,705,140
Patented Mar. 29, 1955

2,705,140

VEHICLE LEAF SPRING SUSPENSION

John A. Roehrig, Pittsburgh, Pa., assignor of one-half to William M. Clark, Pittsburgh, Pa.

Application December 9, 1952, Serial No. 324,920

6 Claims. (Cl. 267—45)

This invention relates to a vehicle spring suspension and, more particularly, to a spring suspension of the type in which the effective length of the spring is automatically shortened as the result of an increase in weight on the vehicle frame, or as the result of tensioning or straightening of the spring caused by road irregularities, and for the purpose of stiffening the spring under such conditions so as to avoid the possibility of breakage of the end thereof, and increase its load capacity. The present application is a "continuation-in-part" of my application Serial No. 285,048, filed April 29, 1952, on "Vehicle Spring Suspension."

It is known in the art to provide a vehicle spring suspension with helper or auxiliary springs, or to provide means for automatically varying the effective length of the spring as the result of loading conditions or road irregularities. However, conventional spring suspensions of these types have the outstanding disadvantage of being rather complicated in construction, many requiring radius rods or requiring shackle assemblies at both ends while others include a number of auxiliary or helper springs or parts which are relatively slidable, therefore, subject to excessive wear from friction, also they are expensive to manufacture. In some types, a solid rolling shoe is used for varying the load carrying points on the leaf spring. However, such shoe, being rigid, detracts appreciably from the softness of the ride.

An object of my invention is to provide a novel vehicle spring suspension which embodies means for automatically shortening the effective length of the spring as the result of an increase in load or as the result of road irregularities, which spring comprises parts which are relatively simple and economical to manufacture and assemble.

A further object of my invention is to provide, in a vehicle spring suspension, a shackle linkage means at the end of the leaf spring, which linkage includes a yieldable rolling member for not only shortening the length of the spring but for contributing its yieldability as a helper element or auxiliary spring in response to loading of the vehicle frame or rebound from road irregularities.

Other objects and advantages of the present invention will become apparent from a study of the following description taken with the accompanying drawing wherein.

Figure 1:
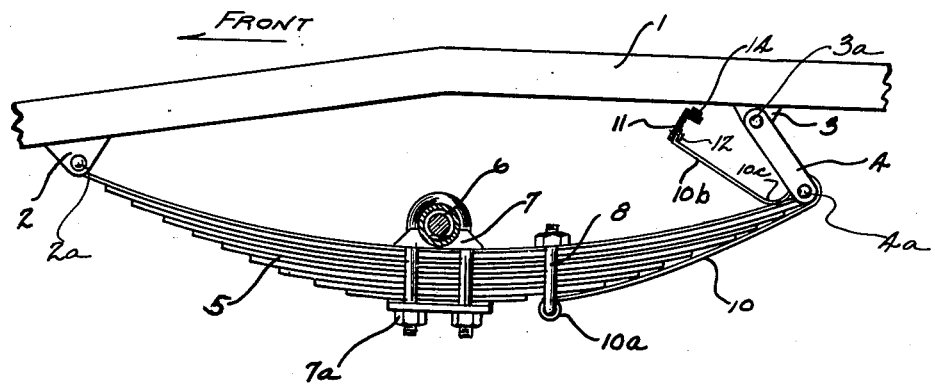
Figure 1 is a side elevation of a spring suspension for the rear wheels of an automobile and embodying the principles of my invention.
Figure 3:
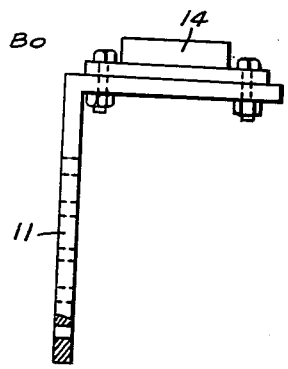
Figure 3 is an enlarged view of the pad and adjustable supporting element.

Referring more particularly to Figure 1 of the drawing, numeral 1 denotes a frame portion at the rear part of a vehicle having rigidly attached, underneath it, a spring supporting bracket or hanger 2 consisting of a pair spaced parallel flanges between which extends a pivotal pin or bolt 2a for supporting the forward end of a multi-leaf spring 5. The direction of the front end of the vehicle is indicated by the arrow.

The leaves of spring 5 are held together, and the central portion of the spring 5 is mounted on (or under) the rear axle 6 by means of U-bolts or clips and brackets 7 which are rigidly held together by tightening of nuts 7a.

Underneath the rear portion of frame 1 is rigidly secured a bracket 3 similar to bracket 2 and through which bolt 3a extends for pivotally mounting the upper end of a shackle 4. The lower end of the shackle 4 is pivotally mounted by pin or bolt 4a to the rear end portion of the longest or uppermost leaf of spring 5.

An important feature of my invention resides in the construction and operation of the shackle linkage which include an auxiliary spring 10, which is in the form of a leaf of somewhat V-shape with one extremity of the leaf terminating in an eye 10a which is wrapped around and anchored to the central portion of a U-shaped member 8 which rigidly embraces spring 5, by tightening of bolts at the top extremities of the U. Of course, other suitable fastening means may be used instead for securely anchoring one end of the leaf 10 to an intermediate portion of the multi-leaf spring 5. A portion of leaf 10 is curved so as to embrace the rear extremities of the various leaves making up spring 5. An intermediate portion of leaf 10 is bent snugly around the eye of spring 5 and then extends into contacting relationship with the uppermost leaf throughout the portion 10c which is curved, thence extends upwardly at an angle, terminating in an upwardly bent portion extending at right angles to portion 10b. Through a hole in this upwardly bent portion extends a bolt 12 which selectively extends through any one of a plurality of holes in a flanged or angular shaped element 11. The uppermost flange of element 11 has attached thereto a pad 14 of resilient material, such as rubber, which is adapted, when contacting frame 1, to slide along the bottom surface of frame 1 to provide a slidable anchor point for the end of spring 10. By virtue of the plurality of holes extending through element 11 (or other adjusting means such as a pin and slot connection) the height of pad 14 may be adjusted so that it may be brought closer to the bottom of frame 1. Normally, a space exists between pad 14 and frame 1, that is during normal operating conditions.

The operation of the spring suspension described hereinabove is as follows:

Assume that the vehicle is lightly loaded or that multi-leaf spring 5 has not become appreciably tensioned either from sudden loading or from an obstacle encountered by the wheels. The relative position of the shackle linkage would be as shown in Figure 1, that is, with the arcuate portion 10c of the leaf 10 contacting the uppermost leaf of spring 5 at a point very close to bolt 4a. Therefore, the effective length of spring 5 is substantially that of the spring without the helper spring portion 10b.

This would be the position of the spring assembly for normal loading of the vehicle, that is, without passengers. With the shackle linkage in this position, a very soft ride is provided since practically the entire length of the upper leaf of spring 5 comes into play.

However, assuming an increase in loading of the vehicle, or the hitting of an obstruction by the rear wheels, this would bring frame 1 and pad 14 into contact because of the tensioning and straightening out tendency of the leaves of spring 5. The helper portion 10b will move toward the top of spring 5 and progressively roll on top of the uppermost leaf so as to progressively move the point of contact with such upper leaf closer and closer to U-bolt 8 to progressively shorten the effective length of the spring. Two highly important results are thus obtained, one, the rolling movement of helper spring portion 10b on the uppermost leaf of spring 5 will gradually increase the stiffness of the spring 5 because of the progressive shortening of its effective length, and secondly, the increase in radius of helper spring portion 10b, as it rolls on the uppermost leaf, will add to the stiffness of the spring assembly; also it will prevent the possibility of breakage of the end of the uppermost leaf of spring 5 which is a relatively weak point under heavy loading or sudden rebound. As the effective length of spring 5 is shortened, for example, as the result of rebound in hitting a hole in the road, the lower portion of leaf 10, that is, the portion extending along the rear extremities of the various leaves of spring 5 tends to control or check the rebounding movement, thus acting somewhat as a shock absorber. Stated differently, the rebound control or lower portion of leaf 10, which embraces the rear ends of the respective leaves tends to resist arching of spring 5 as a consequence of rebound, therefore, it checks rebound movements and provides a more comfortable or softer ride. The limit of the helper spring action of portion 10b is reached when the extremity of portion 10b contacts the uppermost leaf spring 5, thus providing continuous contact along a substantial portion of the upper leaf, and thus shortening the effective length of spring 5 by approximately ⅓. When such point is reached the rubber pad 14 will have slid longitudinally along the lower surface of frame 1 in a direction towards axle 6 and its cushioning effect will resist further tendency of the spring 5 and frame 1 to come closer together. This extreme limit is rarely reached and, instead, even abnormal compression movements are checked long before the effective length of the spring has been reduced as much as ⅓.

Figure 2:
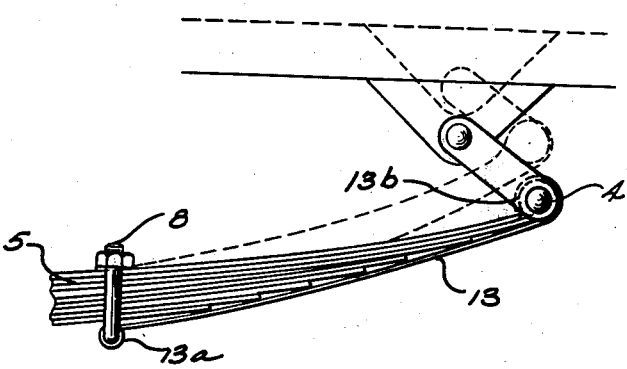
Figure 2 is an enlarged fragmentary view of a modification of the invention shown in Figure 1.

Figure 2 shows a modification of the invention wherein only the rebound control portion of the additional leaf 10 of Figure 1 is used, which rebound control portion is denoted in Figure 2 by numeral 13. That is, the helper part 10b of the leaf 10 has been omitted. The rearmost extremity of leaf 13 is formed into an eye 13b which wraps around the eye of spring 5 and terminates adjacent the extremity of the uppermost leaf of spring 5. The other end 13a is fastened to U-bolt 8 in the same manner as described in Figure 1. The full line position shows that of normal loading, such as that without passengers, or the position prior to rebound. The dash lines show the spring at the extremity of rebound movement such as caused when the wheel drops into a hole in the roadway surface. During such rebound movement, the rebound control leaf or plate 13 will resist the tendency of abnormal reduction in the radius of curvature of spring 5 and will confine the movement to that shown in dash lines, thereby controlling rebound or providing shock absorbing action with less rebound movement, and giving a more comfortable ride.

While the vehicle spring suspension has been described as being applicable to a rear wheel suspension, it will be apparent that it is also useful for a front wheel suspension.

Although a single arcuate helper spring portion is shown at the rear end only of spring 5, it will be apparent that, if desired, two such helpers may be used instead, in which case the forward helper will be the reverse of the rear helper, that is inclined oppositely.

It will also be apparent that by making leaf 10 of stiffer material or of greater thickness, there will be less tendency for shortening the effective length of the spring in response to loading or rebound. Also element 11 may be so adjusted to be either spaced from or in contact with the lower surface of the frame 1 in the normal position (unloaded) of spring 5. It will also be apparent that if only the helper spring portion 10b—10c were desired, U-bolt 8 as well as the portion of spring 10 which embraces the ends of the leaves of spring 5 may be omitted, thus leaving only an eye at the end of portion 10c which will encircle the eye of spring 5.

Thus it will also be seen that I have provided an efficient and relatively simple vehicle spring suspension which will automatically vary the length of the spring in response to loading or rebound from road irregularities in order to increase the stiffness of the spring in response to heavy loading and thus prevent the possibility of breakage at the weakest point, namely, the end of the upper leaf, and to allow the full length of the upper leaf to come into play at the moment the additional loading is removed so as to increase the resilience of the spring and the softness of the ride; furthermore, I have provided a spring suspension which will control rebound movements somewhat as a shock absorber and which greatly stabilizes a car, particularly when travelling around bends, thus being a great aid to knee action cars, particularly, which have a tendency to become unstable around bends; furthermore, I have provided a shackle means for a vehicle spring suspension with means for varying the degree of stiffness of the spring or the softness of the ride, thereby making the spring suitable for widely different loads.

While I have illustrated and described several embodiments of my invention, it will be understood that these are by way of illustration only, and that various changes and modifications may be made within the contemplation of my invention and within the scope of the following claims.

I claim:

1. For use in a vehicle having a frame, a spring suspension for a wheel thereof comprising a multi-leaf spring and a shackle having one end pivotally connected to the spring, and the other end pivotally connectable to the frame, and a helper spring comprising a leaf of spring metal having an arcuate portion mounted so that substantially the entire length of said helper spring will provide continuous, unobstructed rolling contact with the uppermost leaf to vary the effective length of the multi-leaf spring, said helper spring having a free end located immediately underneath said frame and adapted to come into sliding contact with said frame to permit said helper spring to progressively increase in radius and thereby contact a greater length of the end portion of the uppermost leaf as said multi-leaf spring and frame are brought closer together to progressively shorten the effective length of the multi-leaf spring.

2. In a vehicle having a spring suspension for a wheel thereof, comprising a multi-leaf spring connected to said frame and having a shackle pivotally mounting one end of said spring to said frame, a helper and rebound control leaf of spring metal having one end rigidly secured to an intermediate portion underneath said multi-leaf spring and a free end above said multi-leaf spring which is adapted to come into sliding contact with respect to said frame as the result of movement of said multi-leaf spring towards said frame, an intermediate portion of said leaf closely encircling the pivotal connection between said multi-leaf spring and shackle, the free portion of said leaf having an arcuate portion providing continuous, unobstructed rolling contact throughout its entire length with the uppermost leaf of said multi-leaf spring as the multi-leaf spring is moved towards the frame whereby as a consequence of said sliding contact of the free end with the frame, the radius of curvature of said arcuate portion will be progressively increased so as to progressively contact throughout its length a greater length of the end portion of the multi-leaf spring, and thereby progressively decrease its effective length and increase its stiffness.

3. Apparatus as recited in claim 2, wherein said free end of the helper and control spring leaf is provided with adjustable means for varying the distance between the free end and the frame, whereby the stiffness of the multi-leaf spring in response to a given spring movement may be varied.

4. Apparatus as recited in claim 2 together with sliding means adjustably connected to the free end of said helper spring, including adjusting means for varying the distance between said sliding means and frame to thereby vary the stiffness of the multi-leaf spring, and a pad of resilient material secured to said sliding means and adapted to provide cushioned sliding contact with said frame.

5. A spring suspension for supporting a wheel of a vehicle and including a multi-leaf spring extending longitudinally with respect to a longitudinal frame member of said vehicle to which it is connected, and having a shackle pivotally connected to one end thereof and to the frame, a helper and control spring comprising a leaf of spring metal having an intermediate portion mounted so as to snugly embrace one of the ends of the various leaves of said multi-leaf spring and another portion terminating in a free end adapted to provide sliding contact with said frame and having an arcuate portion adjacent said free end arranged to provide unobstructed rolling contact with the uppermost leaf of said multi-leaf spring as the result of movement of said multi-leaf spring towards said frame and sliding movement of said free end underneath said frame, whereby the effective length of said uppermost leaf is progressively decreased, the end of said helper and control spring opposite said free end being rigidly fastened to an intermediate portion of said multi-leaf spring.

6. In a vehicle wheel spring suspension comprising a multi-leaf spring and a shackle having one end pivotally connected to one end of said spring and the other end pivotally connected to the frame of a vehicle, the other end of said spring also connected to said frame, a rebound control spring leaf having one end rigidly secured with respect to an intermediate portion of said multi-leaf spring, the other end of said leaf provided with an eye portion encircling and forming part of the pivotal eye connection between said end of the multi-leaf spring and said shackle, the intermediate portion of said rebound control leaf closely embracing one of the ends of the various leaves of said multi-leaf spring, whereby rebound movements tending to separate said spring from said frame and to decrease the radius of curvature of said multi-leaf spring will be resisted by bending of said spring leaf so as to provide shock-absorber-like action.

References Cited in the file of this patent

UNITED STATES PATENTS

| | | |
|---|---|---|
| 1,597,704 | Young | Aug. 31, 1926 |
| 1,606,386 | Rouanet | Nov. 9, 1926 |
| 1,858,930 | Hoover | May 17, 1932 |
| 1,870,787 | Smith | Aug. 9, 1932 |

FOREIGN PATENTS

| | | |
|---|---|---|
| 349,926 | Great Britain | June 2, 1931 |
| 472,393 | Great Britain | Sept. 21, 1937 |
| 453,647 | Germany | Dec. 12, 1927 |